Figure 1:
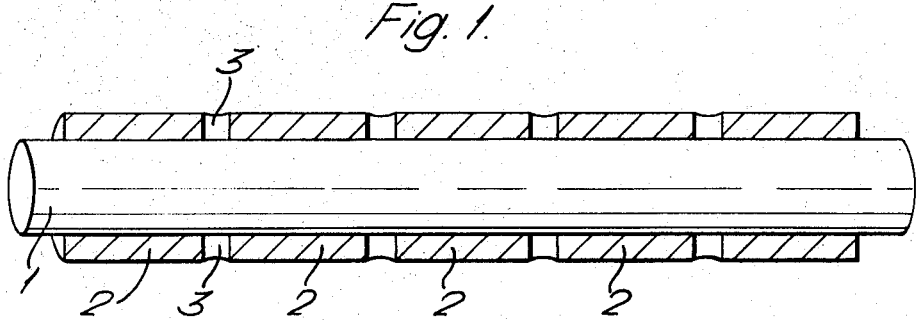

United States Patent [19]
Ells

[11] 3,799,208
[45] Mar. 26, 1974

[54] PIPELINES

[75] Inventor: John William Ells, Bexleyheath, England

[73] Assignee: The British Petroleum Company Limited, London, England

[22] Filed: May 11, 1973

[21] Appl. No.: 359,433

[30] Foreign Application Priority Data
May 26, 1972 Great Britain.................... 24933/72

[52] U.S. Cl. ............................................... 138/175
[51] Int. Cl............................................... F16l 9/14
[58] Field of Search ...... 138/103, 145, 155, DIG. 6, 138/172, 174, 175

[56] References Cited
UNITED STATES PATENTS
367,262  7/1887  Battin ................................ 138/103
2,719,348  10/1955  Desnos............................ 138/145 X

*Primary Examiner*—Jerry W. Myracle

[57] ABSTRACT

In a concrete coated pipeline, the concrete coating is discontinuous, the maximum length of any section of coating being 12 feet and the gap between adjacent coatings (which can be filled with bitumen) at least one-sixteenth inch. Preferably the length is from 2 to 8 feet and the thickness of the coating 2 to 3 inches. The advantage of the structure is that breaking of the coating when laying the pipeline is reduced.

7 Claims, 3 Drawing Figures

PIPELINES

This invention relates to weight coated pipes for joining together to make pipelines suitable for use under water and to a method for their manufacture.

Pipelines which are laid under water usually have a weight coating to provide both an adequate negative buoyancy and protection.

When pipelines are laid under water lengths of weight coated pipe are welded together on a barge and lowered into the water. As the laying progresses further lengths of pipe are welded to the free end of the already laid pipeline. The welded pipe which stretches down through the water to the river or sea bed from the barge takes up a curved shape which is bent mainly at two places. The lower bend near the sea or river bed is called the "sag bend" and the upper bend near the rear of the barge is called the "overbend." The bending of the pipeline in the laying operation can cause damage to the weight coating. In extreme cases the coating can be destroyed leaving the exposed parts of the pipeline vulnerable to current and other hazards such as trawling.

A coated pipe has now been invented which is suitable for welding to other similar pipes to form a pipeline and in which the above described problem is lessened.

According to the present invention there is provided a pipe of outer diameter from 14 to 72 inches having an anticorrosion coating over which is a weight coating from 1 to 8 inches thick in which weight coating there are a number of depressions which extend round the circumference of the coating so that the surface of the weight coating is discontinuous and in the form of a number of sections separated by depressions and wherein the length of any such section of coating is from 1 to 12 feet and the width of any depression from one-sixteenth inch to 6 inches.

The weight coating is preferably concrete, although other materials e.g., resin bonded aggregate or bitumen aggregate can be used.

Preferably the lengths of the sections of weight coating are from 2 feet up to 1½ pipe diameters.

Preferably the lengths of the sections are from 2 to 8 feet more preferably 2 to 4 feet.

The pipe is coated with an anti-corrosion coating e.g., coal tar enamel and fibre glass, or bitumen or paint prior to applying the weight coating. Such anti-corrosion coats are well known in the art and form no part of the present invention.

Preferably the thickness of the weight coating is from 1 to 4 inches more preferably from 2 to 3 inches.

Preferably the depressions are made by cutting an already weight coated pipe at the places where the depressions are required to be formed, although they can also be formed by use of spacers when the coating is applied to the pipe. Preferably the depressions are at regular intervals along the pipe.

The thickness of the coating at the bottom of the depression preferably is from zero up to one-third of the thickness of the weight coating, more preferably at least 5 mm thick, although the depressions can, if desired, extend right down to, and expose, the anti-corrosion coating.

Preferably the width of a depression is from one-twelfth inch up to three-eighths inch.

Preferably the weight coating is reinforced with a steel mesh having reinforcing bars encircling the pipe lying at the centre of the weight coating and also having reinforcing bars lying longitudinally. Preferably there are gaps in the longitudinal bars at the places where the depressions are. Preferably the reinforcing mesh is a heavy mesh more preferably one conforming to BSS 4483.

The depressions can be left unfilled, or, alternatively can be filled with an elastic material e.g., rubber or polyurethane foam.

According to another aspect of the present invention there is provided a pipeline comprising a number of lengths of pipe as hereinbefore defined welded together.

The concrete coated pipe as hereinbefore defined can be made by enclosing the pipe in a mould having spacers, pouring concrete into the mould, allowing to set and removing the mould.

Usually the spacers are also removed. It is, however, possible to use flexible compressible spacers and leave them in position.

Alternatively a concrete coated pipe can be prepared by the impingement method in which the pipe is revolved about its longitudinal axis and concrete applied at high velocity to the revolving pipe.

The invention is illustrated with reference to the accompanying drawings in which FIG. 1 is a longitudinal section of a pipe according to the invention. The pipe 1 is 40 feet long, of outer diameter 32 inches and has a concrete coating in sections 2 which are 3 feet in length and which are nominally 2.35 inches in thickness. Adjacent sections 2 are separated by a gap 3 which is three-sixteenths inch in width.

Figure 2:
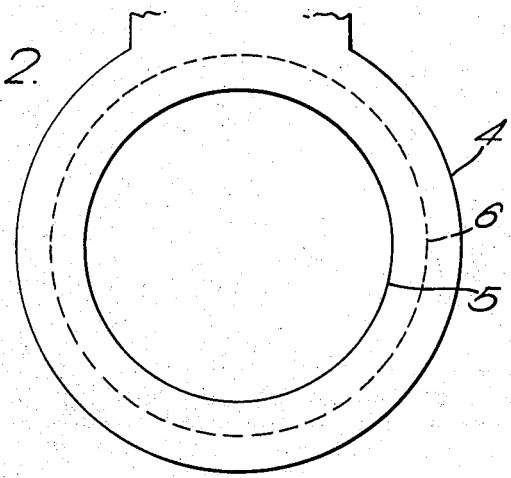

The method of manufacturing the pipe having the discontinuous concrete coating is described with reference to FIG. 2 which shows a cross section of a pipe in the coating process.

The pipe 5 having an anti-corrosion bitumen wrap is placed in mould 4 having spacers (not shown) located every 3 feet at positions along the mould where it is desired to form gaps in the coating. The mould is arranged so that the coating terminates at 0.3 metres from the ends of the pipe. A layer of reinforcing steel mesh 6 conforming to BSS 4483 reference C503 indented mesh is placed at the centre of the coating to be formed over spacers (not shown) with the main reinforcing bars placed circumferentially around the pipe. The reinforcing mesh is discontinuous as is the coating to be formed. The main bars of the mesh are overlapped 8 inches and wired and welded together. Concrete is poured into the mould and allowed to set and the mould removed from the coated pipe.

Figure 3:
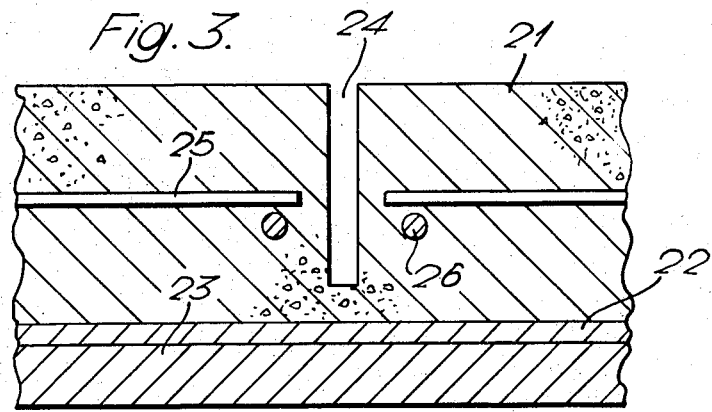

FIG. 3 is a part longitudinal section of the pipe and shows a wall 23 having a coal tar enamel and fibre glass anti-corrosion coating 22 of thickness between 3 and 4.5 mm, on top of which is a steel mesh reinforced concrete coating 21 which is 2.35 inches (60 mms) thick and in which a number of cuts 24 of width one-eighth to three-sixteenths inch have been made at regular intervals so that the coating is in the form of sections 3 feet in length. The steel reinforcing mesh has circumferential rods 26 which lie at the centre of the concrete coating and which encircle the pipe and which are spaced at intervals of 100 mms, and longitudinal rods 25 which lie outside the rods 26 and which have gaps at the places where the cuts 24 are formed.

I claim:

1. A pipe of outer diameter from 14 to 72 inches having an anti-corrosion coating over which is a weight coating from 1 to 8 inches thick and having depressions in the weight coating extending round the circumference thereof so that the surface of the weight coating is discontinuous and in the form of a number of sections separated by the depressions and wherein the length of any such section of coating is from 1 to 12 feet and the width of any depression is from one-sixteenth to 6 inches.

2. A pipe as claimed in claim 1 wherein the thickness of the weight coating at the bottom of the depressions is from zero up to one-third of the thickness of the weight coating adjacent the depressions.

3. A pipe as claimed in claim 2 wherein there is concrete coating on the pipe at the bottom of the depression the thickness of which coating is at least 5 mms.

4. A pipe as claimed in claim 2 wherein the depressions extend completely through the thickness of the weight coating.

5. A pipe as claimed in claim 1 wherein the width of the depressions is from one-twelfth to three-eighths inch.

6. A pipe as claimed in claim 1 wherein the depressions have been formed by making cuts in the coating.

7. A pipe as claimed in claim 1 wherein the length of any section is from 2 feet up to 1½ pipe diameters.

* * * * *